Figure 8A:
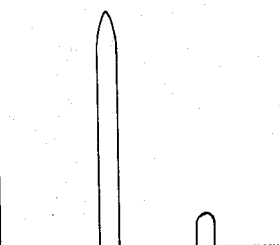

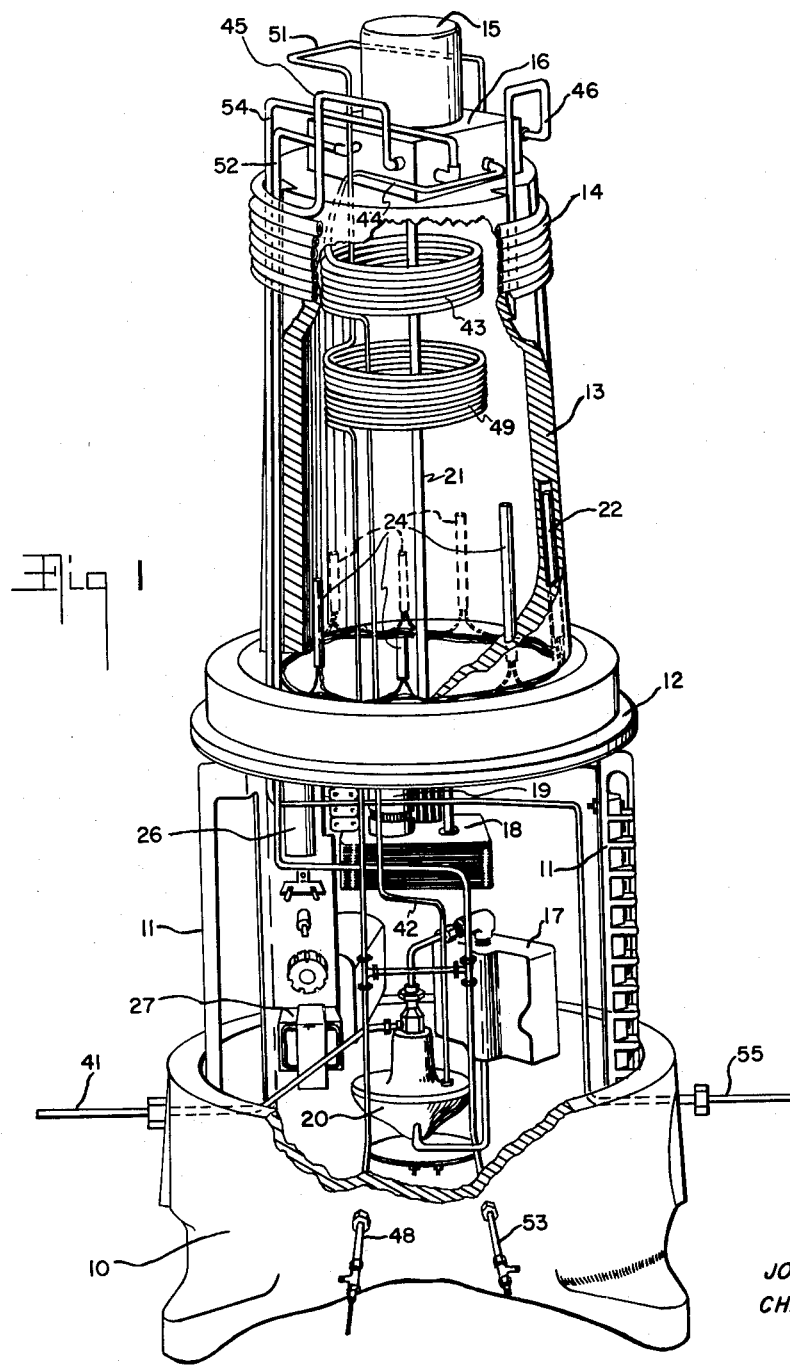
JOHN G. ATWOOD
CHARLES C. HELMS
INVENTOR.
BY  E. R. Hyde Jr.
ATTORNEY

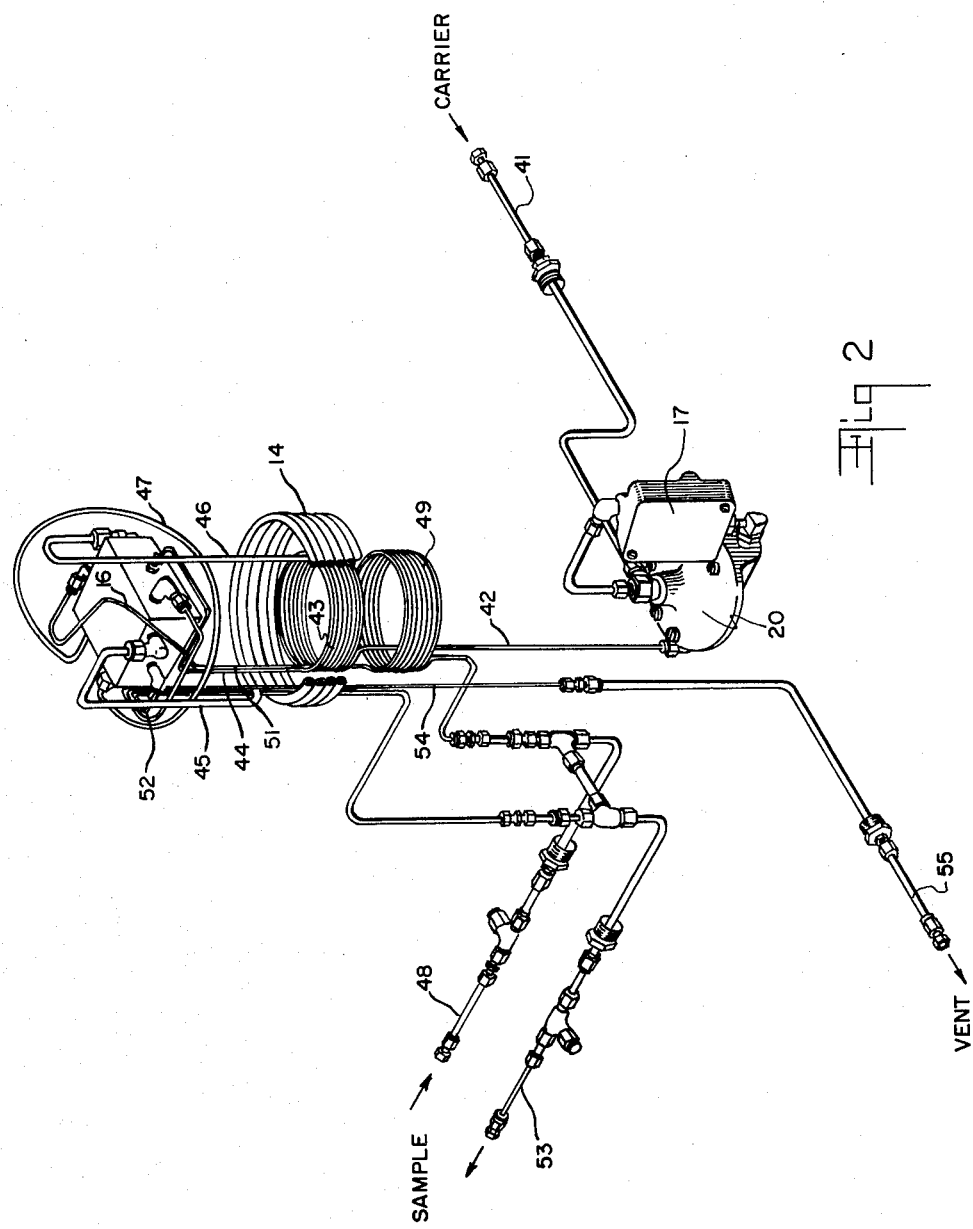

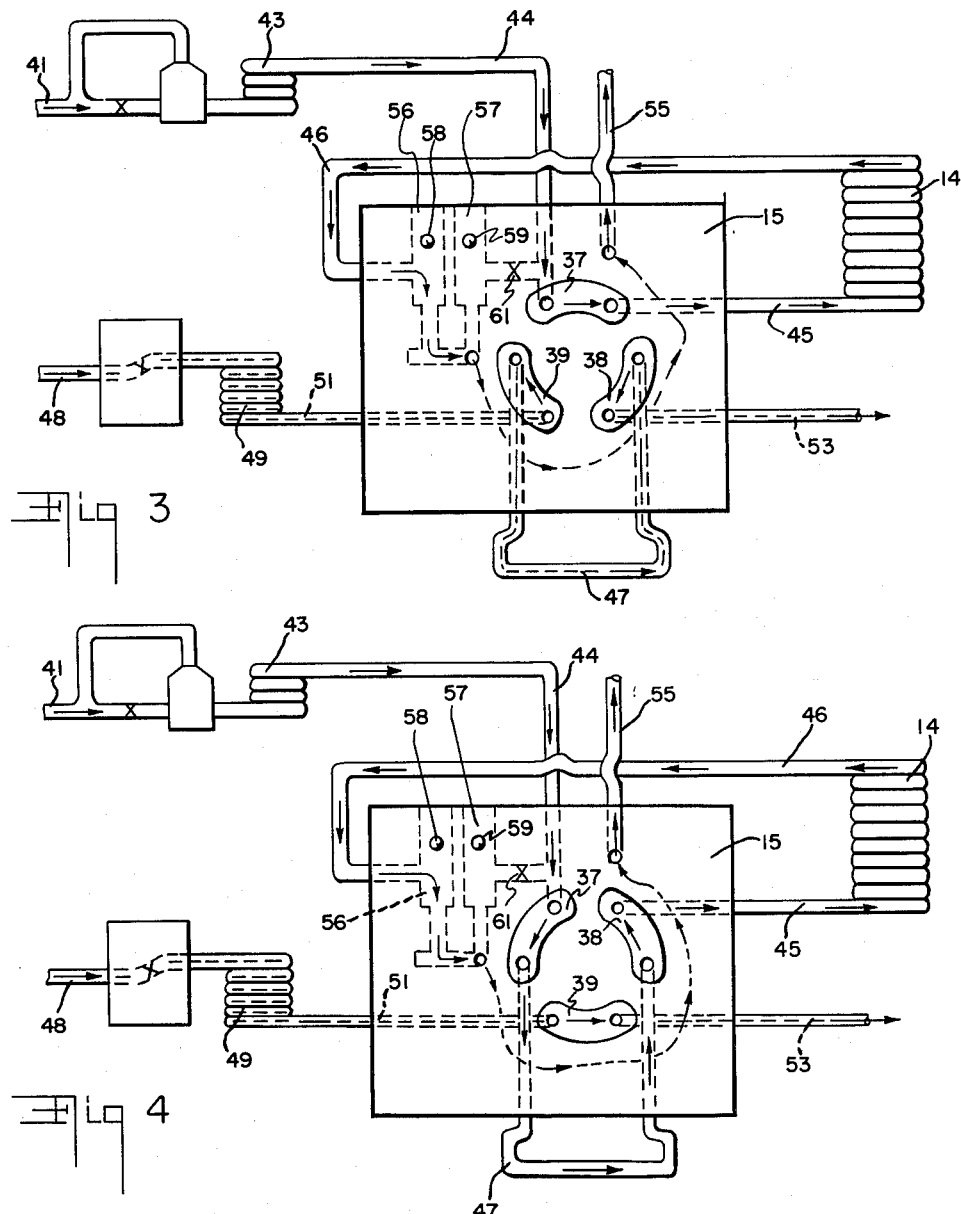

March 27, 1962 J. G. ATWOOD ETAL 3,026,712
CHROMATOGRAPHIC ANALYZER
Filed Oct. 8, 1958 6 Sheets-Sheet 4

JOHN G. ATWOOD
CHARLES C. HELMS
INVENTOR.

BY E.R. Hyde Jr.

ATTORNEY

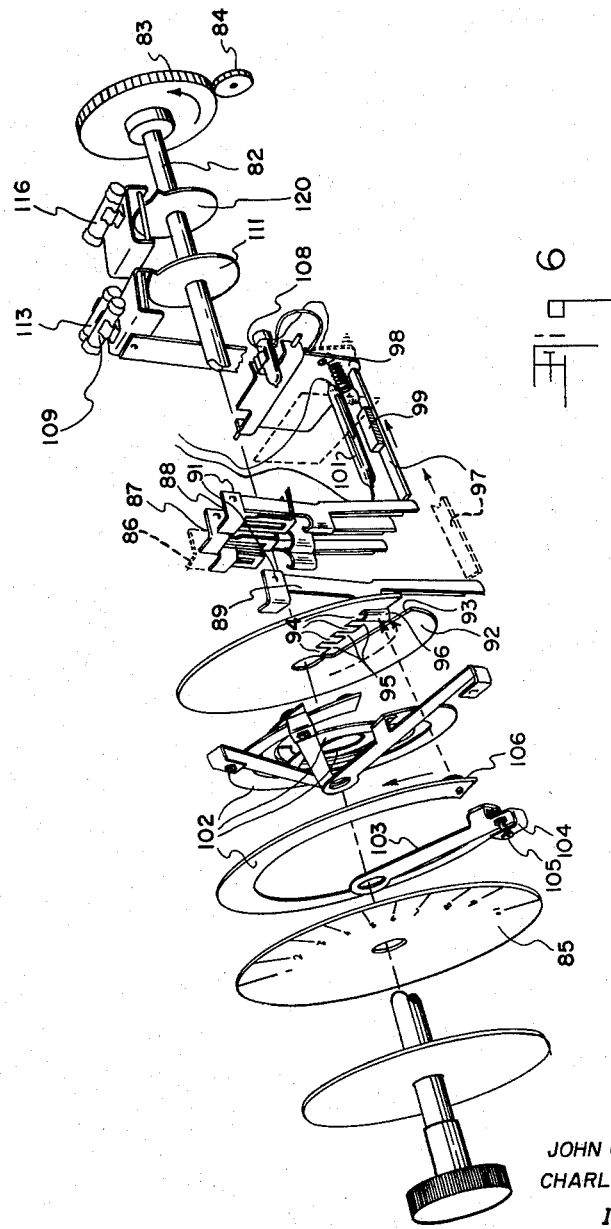

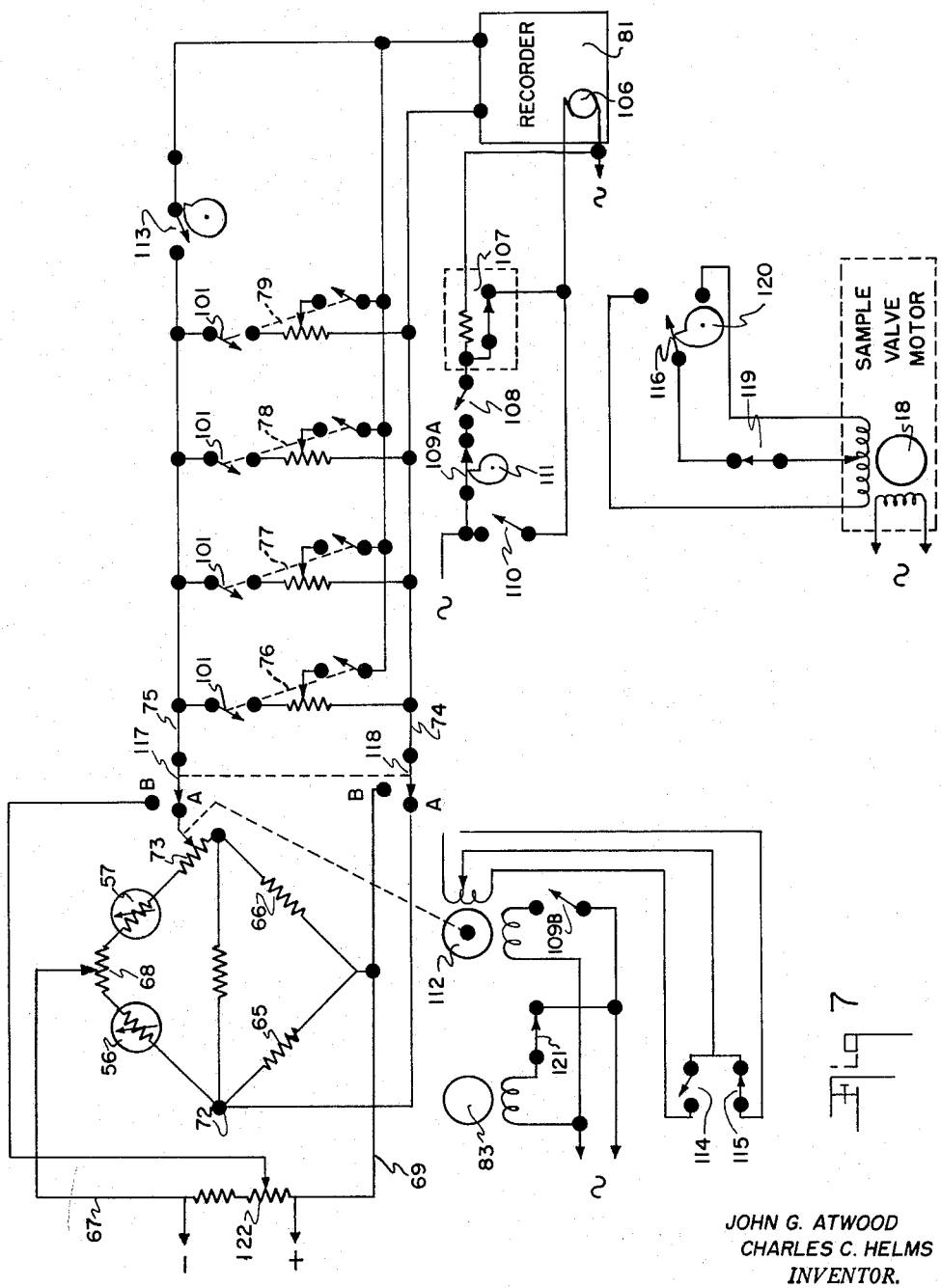

United States Patent Office 3,026,712
Patented Mar. 27, 1962

3,026,712
CHROMATOGRAPHIC ANALYZER
John G. Atwood, West Reading, and Charles C. Helms, Trumbull, Conn., assignors to The Perkin-Elmer Corporation, Norwalk, Conn., a corporation of New York
Filed Oct. 8, 1958, Ser. No. 766,056
2 Claims. (Cl. 73—23)

The present invention relates to gas chromatography and more particularly to a system for the analysis of a continuous chemical stream.

The invention has wide utility and may be used for example in chemical plants such as petroleum refineries where it is desirable to continually monitor a chemical stream. It is often necessary in such plants to insure that the chemical components are maintained within predetermined limits both quantitatively and qualitatively. To accomplish this it has been proposed to periodically sample the chemical stream and analyze the samples by chromatographic techniques. In order to insure accurate results, it is necessary that the sample volume be constant within very close limits. The sensing unit must be reliable and certain in operation and automatic to provide a written record of the periodic samplings.

Accordingly, an object of the present invention is to provide an improved chromatographic analyzer.

Another object of the present invention is to provide a chromatographic analyzer which is of rugged and simple construction to insure reliable and certain operation.

Another object of the present invention is to provide a device for analyzing chemical streams which is entirely automatic and records accurate results of periodic samplings.

A further object of the present invention is to provide a chromatographic analyzer for sampling chemical process streams wherein the samples analyzed are of constant volumes within very close limits.

A further object of the present invention is to provide a chromatographic analyzer wherein the column may be conveniently replaced.

A further object of the present invention is to provide a chromatographic sensing unit having an improved temperature control system.

In accordance with these and other objects, the chromatographic analyzer herein described comprises three major components: a sensing unit, programmer and recorder. The sensing unit contains all the sample handling equipment of the system which includes the chromatographic column, sample metering volume, sample valve, thermal-conductivity detector and carrier gas regulator. A motor controlled from the programmer is also located within the sensing unit to operate the sampling valve which periodically injects a sample volume into the column. The analyzer is of unique construction and is divided into two compartments which are independently thermostated. The incoming sample and carrier gases pass through lengths of tubing in contact with a hollow mandrel to insure that the gases are at the proper temperature before entering the detector. After passing through the column and detector, the sample and carrier gases are vented outside the instrument.

The programmer controls the operation of the sensing unit and connects to a recorder that graphically indicates the results of each sampling operation. Within the programmer there is a master timing motor, timing switches for the sample valve motor, a novel automatic zero control, power supply for the detector, signal attenuators and their timing switches.

The recorder includes a chart drive motor controlled from the programmer, a pen controlled through the programmer to draw a graph representing the sample analyzed, and limit switches to operate the automatic zero adjustment motor located in the programmer.

Figure 5:
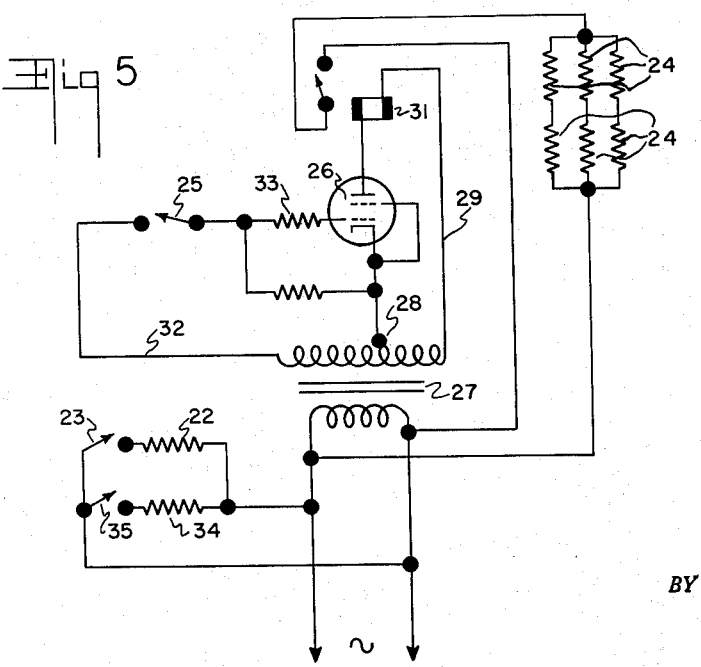

The invention will be more fully understood from the following description of a specific embodiment thereof taken with the drawings in which FIG. 1 is a perspective view partially in section of the sensing unit with certain members removed to show the internal structure thereof, FIG. 2 is a perspective of the tubing or piping arrangement of the sensing unit, FIGS. 3 and 4 are schematic drawings of the two positions of the sampling valve showing the flow of carrier gas and the sample volume, FIG. 5 is a schematic wiring diagram of the thermostating arrangement of the sensing unit, FIG. 6 is a prospective view of a portion of the programmer showing the timing mechanism for certain switches thereof, FIG. 7 is a schematic wiring diagram of the programmer, and FIGS. 8A, B and C show recorder graphs produced under different programmer operating conditions.

Referring now to the drawings and more particularly to FIG. 1, there is shown the mechanical structure of the sensing unit which is supported on a base 10. Vertical supports 11 are secured at their lower ends to the base and at their upper ends to a circular plate 12 which serves to divide the unit into lower and upper compartments. A tapered cast aluminum mandrel 13 is secured at its lower end to the plate 12 and tapers upwardly to conveniently support the chromatographic column 14. Mounted on the top of the hollow mandrel 13 is a detector unit 16 and sampling valve generally indicated by numeral 15.

The lower sensing unit compartment contains a flow regulator 20, flow restrictor 17 and certain electrical units of the heater control circuit. The sampling valve 15 on the top of the mandrel is operated by a motor 18 mounted to the underside of plate 12. The motor shaft is received in a gear box 19 which provides a gear reduction between the motor and the valve control shaft 21. This shaft extends from the gear box upward through a hole in plate 12 and through the mandrel 13 to the sampling valve 15.

The sensing unit is maintained at proper temperatures by a thermostating arrangement comprising three separate thermostat systems which will now be described by reference to FIGS. 1 and 5. The first is a fast warm up system which is effected by a tubular heater 22 located in the bottom of the mandrel. This heater may be of the order of 350 watts and serves to quickly bring the upper compartment of the sensing unit close to operating temperature. Heater 22 is controlled by a bimetallic thermostat 23 which may be located in the bottom of the mandrel. This thermostat will close its contacts when the system is turned on to connect the power source to heater 22 and thus quickly raise the temperature of the mandrel. The bimetallic thermostat 23 is set to switch the heater off several degrees below the operating temperature selecting for the column.

The second thermostat system includes a series-parallel combination of six heater units 24 also located in the bottom portion of hollow mandrel 13 and controlled by a mercury thermostat 25 which may be positioned in a slot on the side of the mandrel. The mercury thermostat 25 does not carry the heater current directly but rather controls the grid circuit of a thyratron tube 26. The power source connects to the primary of a transformer 27, the secondary of which is center-tapped as at 28 to connect to the cathode of the thyratron. One end of the transformer secondary connects by wire 29 to a relay 31, the other end of which connects to the anode of the tube. The thermostat 25 connects to one end of the transformer secondary by wire 32 and to the tube control grid through a resistor 33. Thus it is seen that when the temperature of the mandrel is below the thermostat setting, contacts 25 are open and there is no bias on tube 26. The latter conducts to close the contacts of relay 31 to energize the six fine control heaters 24 which bring the temperature of the mandrel up to the proper operating point. As the operating temperature is reached, switch 25 closes to apply a bias to the grid of tube 26 which thereupon extinguishes to open the contacts of relay 31. In this manner a novel control circuit is provided for the accurate temperature control necessary in the upper compartment of the sensing unit.

A base heater 34 may be located at the bottom of the base casting 10 and controlled by a thermostat 35 to maintain the temperature of the lower compartment at a proper operating point.

The sampling valve 15 that meters the volume to be analyzed is controlled by the motor 18 as pointed out above. The specific structure of this valve forms no part of the present invention and is therefore shown schematically in FIGS. 3 and 4. For present purposes, it need only be pointed out that this valve is structurally connected to the detector block 16 and includes a Teflon rotor having three slots 37, 38 and 39 milled into its bottom surface. As the rotor is selectively turned to its two positons, adjacent ports in the valve block are connected as seen in FIGS. 3 and 4. Before describing the operation of the sampling valve, the piping system will be considered by reference to FIG. 2. A supply of carrier gas such as helium is connected to tube 41 and passes through a flow restrictor 17 and flow regulator 20. The flow regulator and restrictor may be of conventional construction and hence the details thereof are not herein shown. The regulator, for example, may be of the ordinary diaphragm pressure type, while the restrictor provides a variable restriction to adjust the pressure drop across the regulator.

From the flow regulator, the carrier gas flows through tube 42 to a pre-heat coil 43 located inside the mandrel for equalizing the gas temperature and is then directed into a port in detector block 16 by carrier input tube 44.

As will become apparent hereinafter in describing the valve operation, detector block 16 has eight openings therein to receive tube couplings. With the valve in the normal or charge position, the carrier gas, after entering the detector block through tube 44, passes out through tube 45 which connects to the chromatographic column 14. This column contains the stationary phase liquid which is spread out over a powered solid such as crushed fire brick to expose a large surface area to the gas. It is understood that because components of the analyzed gas in the sampled mixture have different affinities for the stationary phase, the gases in the mixture will separate and each will emerge separately. The other end of column 14 connects through tube 46 to another port in detector block 16. The sample volume column takes the form of a tube 47, each end of which is connected to ports in block 16. A sample inlet 48 is adapted to be connected to the main chemical stream being monitored and serves to direct the gas through a sample preheat coil 49 and then through tube 51 to the sample input port of the detector block. A sample vent tube 52 leads from the block to the sample output line 53. The eluted carrier and sample gas is carried from the detector block through tube 54 to the output 55.

The detector block 16 contains two gas chambers 56 and 57 which serve as the sensing chamber and reference chamber respectively. Each chamber contains a thermistor bead 58 and 59 respectively connected in opposite legs of a Wheatstone bridge which will be described below in considering the programmer unit.

As seen in the FIG. 3 wherein the valve is in the normal or charge position, carrier gas from tube 44 flows through the valve slot 37, tube 45, column 14, tube 46 through the sensing cell 56 and is vented out through tube 55. At this time the sample stream passes into the detector block through tube 51. It should also be noted that the carrier gas at this time also passes through the reference chamber 57 controlled by valve 61. The purpose of this valve is to reduce the carrier gas pressure to atmospheric, and accurately control the flow through the reference cell in order to prevent back diffusion of the sample.

A metered volume of sample is introduced in the column by rotating the valve to the position shown in FIG. 4. In this position the carrier gas may be traced through tube 44 milled slot 37 of the valve rotor, sampling volume tube 47, column 14, sensing cell 56 to vent 55. It is seen then that at this time the volume of sample gas previously located in tube 47 is carried along with the carrier through the column. The sample gas is thus separated into its components and the eluted sample in passing through chamber 56 will vary the thermoconductivity therein to effect a varying resistance of the thermistor bead 58. At this time the reference cell 57 has pure carrier gas passing therethrough and the resistance of thermistor bead 59 is maintained constant. After a predetermined interval of time as determined by the setting of the programmer, the valve is rotated back to the charge position. In this manner, the periodic rotation of the sampling valve effects a periodic sampling of the gas stream.

The entire sensing unit of FIG. 1 is suitably enclosed in a housing and the upper compartment enclosed with an explosion proof cover. These elements are omitted from the drawing in order to show the interior of the unit.

The programmer comprises a separate unit which may be located a convenient distance from the sensing unit and electrically connected thereto by a cable. The two basic functions of the programmer are (1) to control the sample valve motor in the sensing unit and (2) to receive the signals from the detector cells and after appropriate modification apply them to the recorder.

Reference will now be made to FIG. 7 which shows the schematic wiring diagram of the programmer. The thermalconductivity detector cells 56 and 57 are connected in a bridge circuit along with fixed resistors 65 and 66. A D.C. supply is applied to the bridge circuit by wire 67 connected to the center tap of a course zero adjustable resistor 68 and by wire 69 connected to the opposite point. The bridge output is taken at point 72 and at a fine zero control resistor 73 by wires 74 and 75 respectively.

It is understood that as the effluent from the column passes through the sensing cell 56, pure carrier gas is passing through the reference cell 57. The components of the sample will be displaced in time to vary the thermal-conductivity of sensing cell 56 to cause a bridge unbalance which is a function of the separated sample components. Thus a varying potential will appear across conductors 74 and 75 indicating the separated components of the monitored chemical stream. Although the present invention contemplates sensing for any number of components, the embodiment herein disclosed by way of example considers a four component separation and analysis. Accordingly, four potentiometer attenuators 76, 77, 78 and 79 are shown interposed between the bridge output and the recorder 81. One purpose of the potentiometers is to adjust the signals to the recorder for maximum scale deflection. Each potentiometer corresponds to one of the separated sample components, and since the latter are spaced in time of the sampling cycle, the potentiometers must be timed and sequentially closed to connect the bridge to the recorder as the sampled components pass through the sensing cell. That is, as the first component is detected, the contacts of potentiometer 76 will close and the recorder pen will deflect in accordance with the presence and concentration of the first component. Similarly, the contact of potentiometers 77, 78 and 79 will close at the times that the succeeding components pass through the sensing cell 56.

The sequential timing of the attenuator potentiometers will now be described by reference to FIG. 6 which is a partially exploded view of the mechanical timing system of the programmer with some elements omitted for clarity. Timing shaft 82 is continuously rotated by a timing motor 80 (FIG. 7) which may be a constant speed synchronous motor connected to the timing shaft by suitable gears 83 and 84. A timing dial 85 is secured to shaft 82 to continuously rotate therewith and a plurality of actuator arms 86, 87, 88 and 89 are pivotally mounted in any suitable manner to the programmer unit so that they may swing forward and backward around their pivot points 91. Located forward of the actuator arms is a circular inclined ramp 92 having a radial slot 93 cut therein. The upper edge of the slot has four depending fingers 94 formed by four vertical slots 95. Each of the actuator bars has a forwardly projecting hook such as 96 on actuator bar 89. As seen in FIG. 6, the hook element 96 is received in the outer vertical slot 95 and passes around the depending finger 94. It is understood then that the actuator arms are free to pivot an amount depending upon the depth of the hook element 96. In their normal positions, the actuator arms are urged forward by their respective bars 97 which are in contact with a depending pivotally mounted plate 98. Each bar 97 has a permanent magnet 99 mounted on the upper surface thereof adjacent a magnetic leaf switch 101. Thus as a bar 97 moves rearward, its associated magnet 99 will close the adjacent switch 101. It is understood that there is a bar 97, magnet 99 and switch 101 associated with each actuator arm.

Positioned between the inclined ramp 92 and the rotating timing dial 85 are a plurality of circular concentric leaf springs 102. Each spring is normally offset and has a radially extending arm 103. The inner end of each arm has an opening which receives the timing shaft 82. The outer end of each arm 103 has a bentover portion 104 that receives a screw 105. The bentover portion 104 is adapted to pass around the edge of the timing dial 85 and the spring can be secured thereto by tightening its screw 105. Thus the relative angular positions of the four circular springs can be manually set and secured to the continuously rotating timing dial. As each spring rotates, it is compressed by inclined ramp 92 until the end such as 106 drops off the radial edge 93 of the ramp. At this time the end of the spring will contact the hooked portion 96 of its respective actuator arm which will thereupon pivot rearwardly to close its respective potentiometer contact switch 101.

In setting the potentiometer attenuators a known sample is first passed through the sensing cell and the time displacement of the sample components are noted. Each of the four circular leaf springs 102 are then rotated in accordance with the time displacement of the components and the correct angular position around the timing dial 85. Therefore, as the ends of the four leaf springs drop off the edge of ramp 92, the respective potentiometer switches 101 are closed and the signals at the output of the Wheatstone bridge are applied to the recorder in their proper timed position. The proper scale deflection of the recorder is manually set for each of the sampled components by adjusting the resistors of each of the attenuators 76, 77, 78, 79.

Figure 8B:
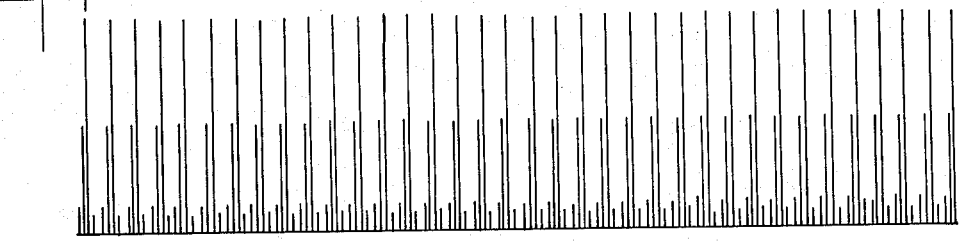
Figure 8C:
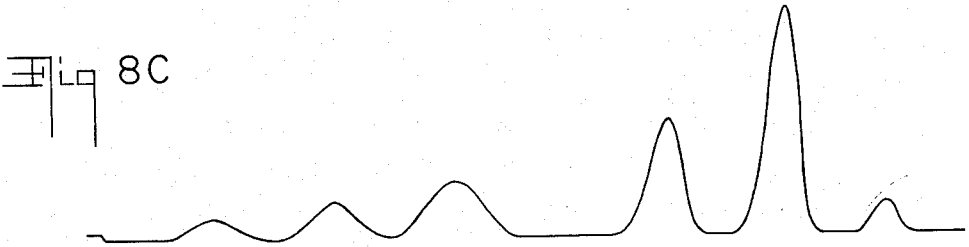

If during the above described operation the recorder chart motor 106 is continuously running, a graph such as that shown in FIG. 8C will appear on the recorder chart. It is contemplated that the present system will provide bar graphs and thus in normal operation recorder chart drive motor 106 does not move while peak deflection is recorded. After each deflection, the chart is energized to advance the chart a small increment such as a tenth of an inch. This stepping of the chart is controlled by a thermal time delay relay 107 along with switch 108 and the A contacts of switch 109. As seen in FIG. 7, with switch 110 open, chart motor 106 will be energized only when the contacts of relay 107, switch 108 and the A contacts of switch 109 are all closed. Switch 109A which is normally closed is controlled by a cam 111 mounted on the timing shaft 82 and opens for a brief interval rotation of the shaft for a purpose to be hereinafter described. The contacts in the relay 107 are normally closed but are timed to open five seconds after the relay heater circuit is closed. Switch 108 is a single pole, single throw mercury switch mounted on the pivoting plate 98 which is actuated by the actuating arms of the magnetic attenuator switches. Thus switch 108 closes and permits the chart motor to run when a magnetic attenuator switch is opened. When an attenuator switch is closed, switch 108 opens to stop the recorder chart motor and open the relay circuit to permit the thermal relay to reset.

If the bridge zero drifts because of a shift in thermistor resistance, deposits of sample residue in the detector cell or other reasons, it is automatically reset by a motor 112 connected to drive the fine zero potentiometer 73. The field winding of the motor is connected to a source of supply through the B contacts of cam operated switch 109. This switch is a single pole double throw mercury switch and operates so that when its B contacts close to energize the motor field, its A contacts, connected in the chart motor circuit described above are open. Thus when the automatic zero system functions, the chart motor is de-energized. Cam 111 also controls a mercury switch 113 which closes to connect the bridge output directly to the recorder input thereby bypassing the attenuators. The direction of rotation of motor 112 is controlled by limit switches in the recorder. A high limit switch 114 and low limit switch 115 are selectively closed if the recorder pen is more than a predetermined amount above or below its normal position. Thus if switch 114 closes indicating an up scale zero drift, motor 112 will rotate to appropriately adjust potentiometer 73. Similarly, switch 115 will cause the motor to rotate in the opposite direction to adjust the potentiometer.

The valve motor 18 in the sensing unit is controlled by a cam operated switch 116. The cam 120 is secured to the timing shaft 82 and functions to close switch 116 once during each rotation of the shaft.

A selector switch is provided on the programmer and serves to operate switches 110, 117, 118, 119 and 121. The selector switch is manually operable to four positions: Normal, Fract, Time and Cal. In the normal position, each of these switches are positioned as shown in FIG. 7 and the analyzer operates automatically with the automatic zero control functioning and the recorder drawing bar graphs as shown in FIG. 8B. When it is desired to run a fractogram, the switch is turned to the Fract. position whereupon switch 110 closes and switch 121 opens whereby the chart runs continuously and the timing motor is de-energized. At this time the timing dial is hand rotated to connect an attenuator to the bridge circuit. With the chart motor running, a fractogram as shown in FIG. 8C will be recorded. In the time position, the chart motor switch 110 is closed and operation continues the same as in the normal position to provide a recording such as shown in FIG. 8A. With the selector switch in the calibrate position, valve motor switch 119 is opened and timing motor switch 121 is open to de-energize the valve and timer motors. Switches 117 and 118 transfer to their B contacts whereupon the bridge is bypassed and the attenuators are connected to the D.C. supply through voltage divider 222. In this position, the attenuator potentiometers may be calibrated. The timing dial is rotated by hand to connect the attenuators to the supply and the potentiometer 122 is adjusted to set the voltage across the attenuators. Then each attenuator is individually calibrated by adjusting the center tap thereof until the recorder reads the desired respective value.

Although the present invention has been described with respect to a specific embodiment thereof, it is understood that his is not to be considered as limiting the scope of the invention as set forth in the appended claims.

We claim:

1. A chromatographic analyzer comprising means forming an upper compartment and a lower compartment, a tapered hollow mandrel located in the upper compartment, valve means, a chromatographic column formed of coiled tubing positioned around the outer surface of the mandrel in contact therewith, sample volume means having an inlet and outlet connected to said valve means, thermal detector means connected to said valve means, carrier gas preheat means and sample gas preheat means each located within said mandrel, means connecting said carrier gas preheat means and said sample gas preheat to said valve means, valve motor means, means interconnecting said motor means and said valve means and adapted to operate the valve means upon selective operation of the motor means, means whereby a first position of the valve means interconnects said carrier gas preheat means with the chromatographic column and interconnects the sample volume means with the sample gas preheat means, means whereby a second position of the valve means, interconnects said sample volume means, chromatographic column and thermal detector means, first electric heater means located within the wall of said mandrel, second electric heater means located within the wall of the mandrel, third electric heater means located in said lower compartment, circuit means, said circuit means including first thermostat means connected to the first heater means to quickly bring the upper compartment to the approximate operating temperature, second thermostat means connected to the second heater means to maintain the upper compartment at the operating temperature and third thermostat means connected to the third heater means to control the temperature of said lower compartment.

2. A chromatographic analyzer comprising means forming an upper compartment and a lower compartment, a tapered hollow mandrel located in the upper compartment, valve means mounted on the upper end of the mandrel, a chromatographic column formed of coiled tubing positioned around the outer surface of the mandrel in contact therewith, sample volume means having an inlet and outlet connected to said valve means, thermal detector means connected to said valve means, carrier gas preheat means and sample gas preheat means each located within said mandrel, means connecting said carrier gas preheat means and said sample gas preheat means to said valve means, valve motor means located in the lower compartment, means passing through said mandrel interconnecting said motor means and said valve means and adapted to operate the valve means upon selective operation of the motor means, means whereby a first position of the valve means interconnects said carrier gas preheat means with the chromatographic column and interconnects the sample volume means with the sample gas preheat means, means whereby a second position of the valve means interconnects said sample volume means, chromatographic column and thermal detector means, first electric heater means located within the wall of said mandrel, second electric heater means located within the wall of the mandrel, third electric heater means located in said lower compartment, circuit means, said circuit means including first thermostat means connected to the first heater means to quickly bring the upper compartment to the approximate operating temperature, second thermostat means connected to the second heater means to maintain the upper compartment at the operating temperature and third thermostat means connected to the third heater means to control the temperature of said lower compartment.

References Cited in the file of this patent

UNITED STATES PATENTS 2,757,541    Watson _____ Aug. 7, 1956

OTHER REFERENCES

Article, by Dimbat et al., published in Analytical Chemistry, vol. 28, No. 3, March 1956, pages 290–297. (Copy in 73–23C.)

Article, Automatic Instrument for Hazardous Areas, published in Oil and Gas Journal, pages 136–140, Dec. 17, 1956. (Copy in 73–23C.)

Book, Vapor Phase Chromatography by Desty, Butterworth's Scientific Publications, London, 1956. Page 215. (Copy in Patent Office Library.)

Article, Gas Chromatography in Plant Streams by D. Fuller, published in ISA Journal, pages 440–444. (Copy in 73–23C.)